April 24, 1945.                F. W. CALDWELL                2,374,412
                          AIR FILTER FOR AIRCRAFT ENGINES
                        Filed April 24, 1943      2 Sheets—Sheet 1
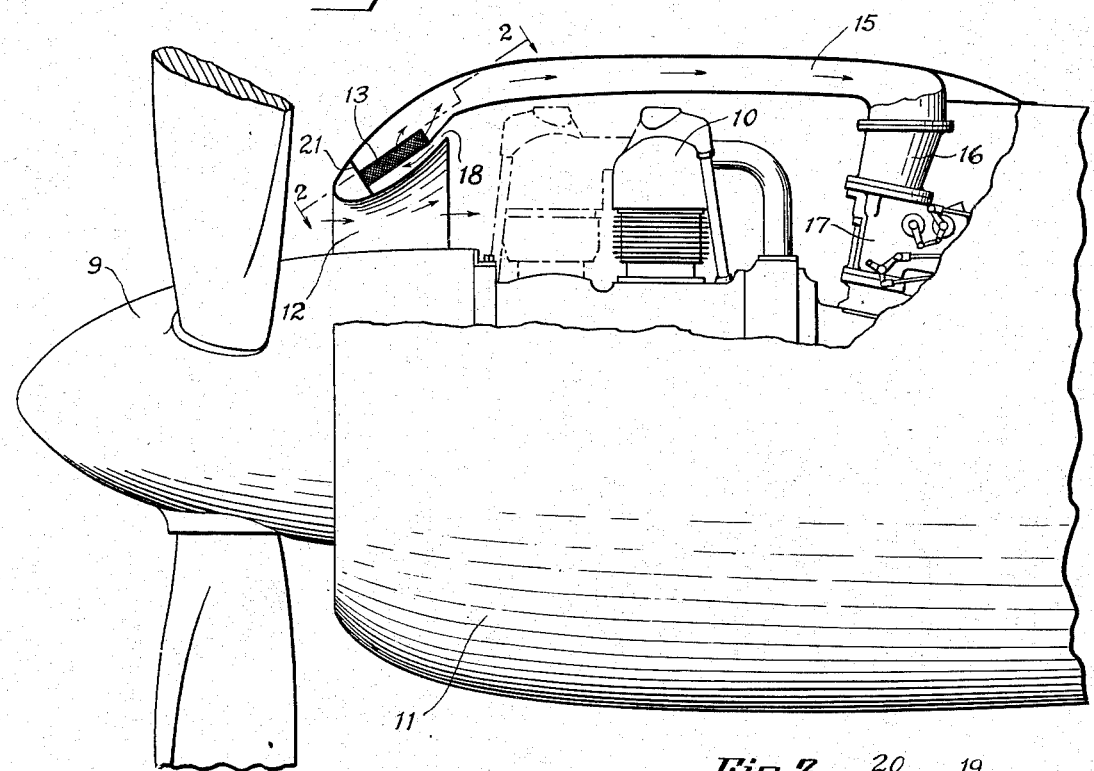
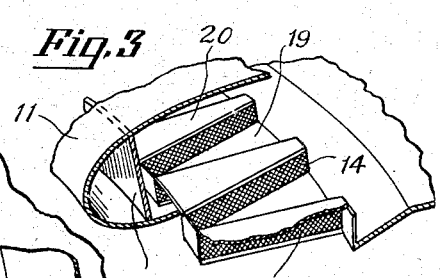
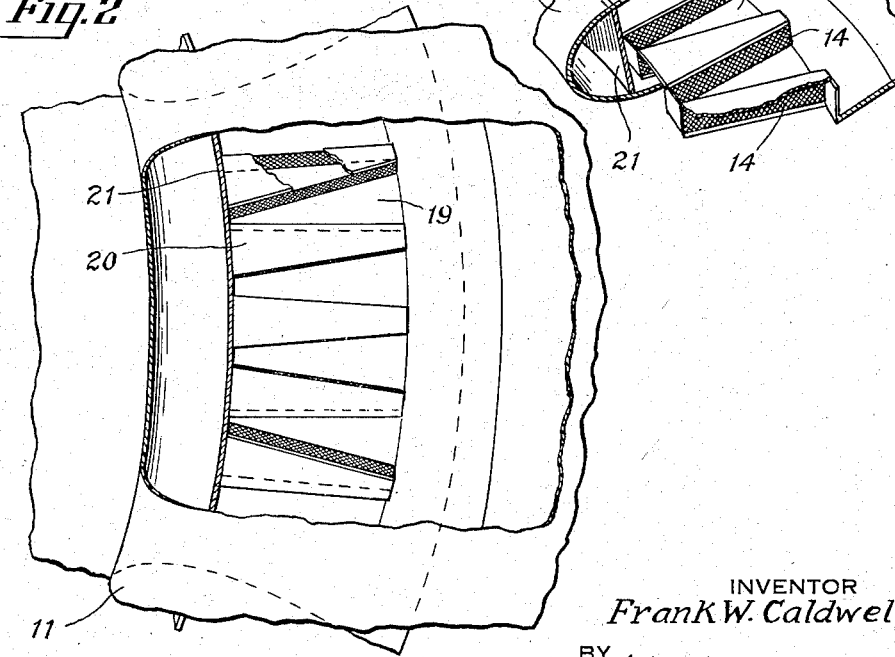
INVENTOR
Frank W. Caldwell
BY Charles L. Shelton
ATTORNEY.

April 24, 1945.　　　F. W. CALDWELL　　　2,374,412
AIR FILTER FOR AIRCRAFT ENGINES
Filed April 24, 1943　　　2 Sheets-Sheet 2
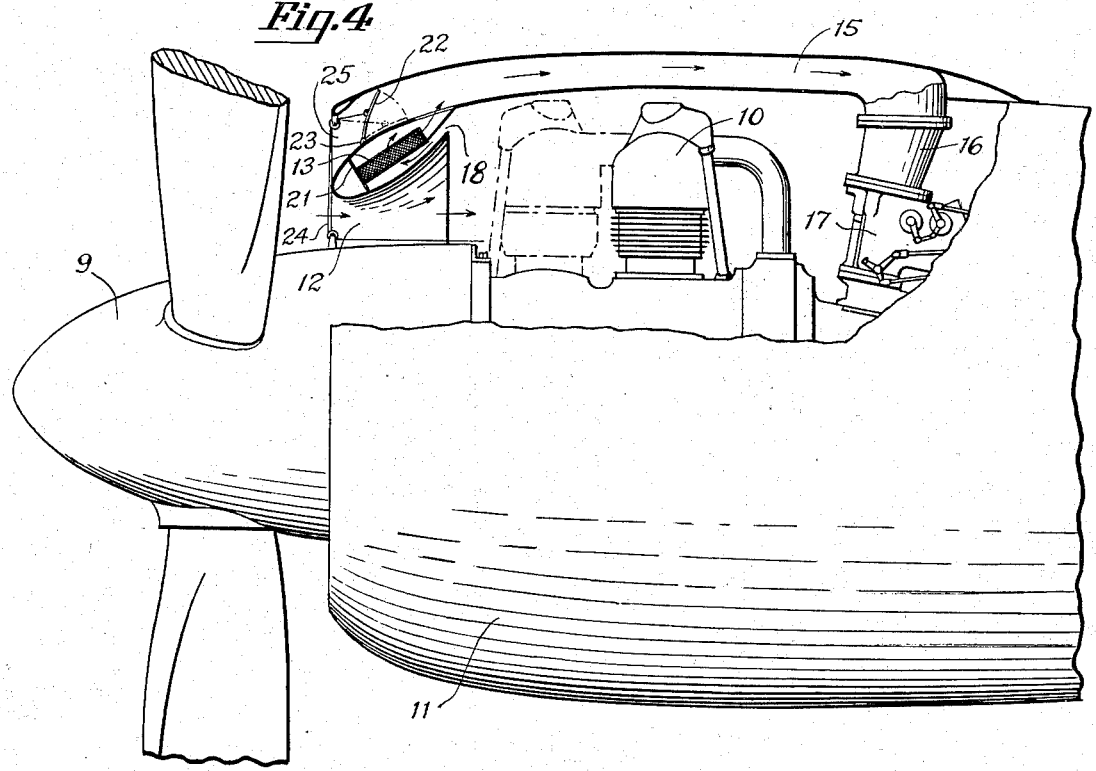
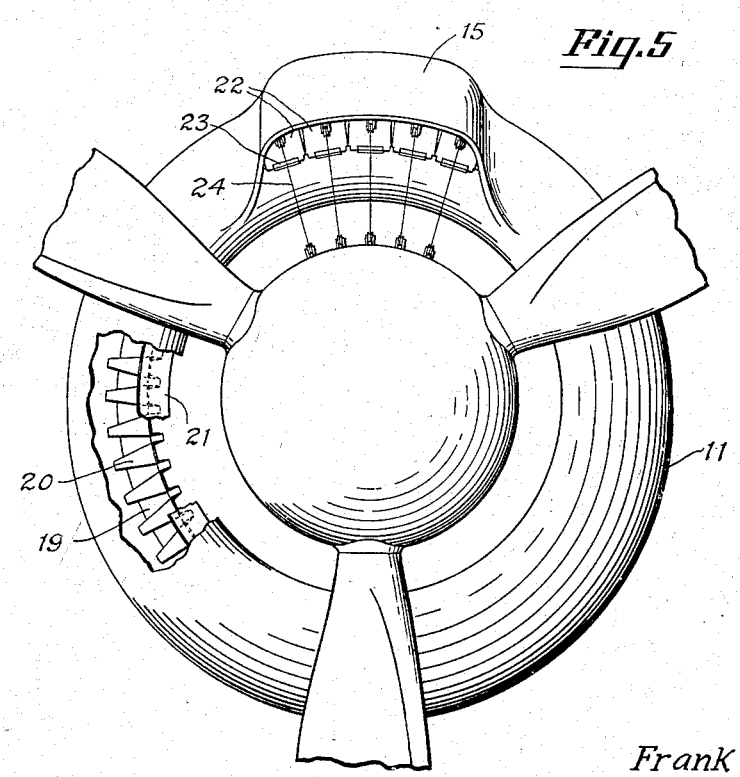
INVENTOR
Frank W. Caldwell
BY
Charles L. Shelton
ATTORNEY.

Patented Apr. 24, 1945

2,374,412

UNITED STATES PATENT OFFICE 2,374,412

AIR FILTER FOR AIRCRAFT ENGINES

Frank W. Caldwell, West Hartford, Conn., assignor to United Aircraft Corporation, East Hartford, Conn., a corporation of Delaware Application April 24, 1943, Serial No. 484,408

6 Claims. (Cl. 123—119)

This invention relates to aircraft engines and particularly to means for filtering air admitted to the carburetor intake for the engine.

A primary object of the invention is to provide an efficient form of air filter housed within the cowl surrounding and streamlining an aircraft engine so that a part of the air passing the engine within the cowl may be diverted and passed through a filter into a conduit leading to the engine carburetor intake.

Another object of the invention is to provide a filter preferably in the form of an annulus within the cowl and having a large area of screening material through which air passes from the space within the cowl to the conduit leading to the intake so that a maximum volume of air may be filtered without appreciably reducing its pressure.

Another object of the invention is to provide a manually operated gate or by-pass connection in the conduit leading from the forward end of the cowl to the carburetor intake so that when desired air may be admitted directly to the conduit leading to the carburetor from outside of the cowl and without passing through the screens forming the air filter.

Other objects and advantages will be apparent from the specification and claims and from the drawings which illustrate what are now considered to be preferred embodiments of the invention.

In the drawings

Fig. 1 is a side view, in elevation of the forward end of an airplane showing, partly in section, an engine cowl, a filter made in accordance with the present invention, and a conduit leading from the filter to the carburetor.

Fig. 2 is a view partly in section and on an enlarged scale showing a portion of the filter, the section being taken substantially on the plane of line 2—2 in Fig. 1.

Fig. 3 is a fragmentary perspective view of a portion of the filter shown in Fig. 1.

Fig. 4 is a view similar to Fig. 1 showing another embodiment of the invention, and Fig. 5 is a front elevation of the embodiment of the invention shown in Fig. 3 a part of the cowl being broken away to more clearly indicate the construction of the filter.

In its preferred form, the invention may include some or all of the following principal parts: First, an aircraft engine; second, a generally cylindrical cowl surrounding and streamlining the engine; third, a filter preferably comprising a plurality of screens arranged in annular form and housed within the forward end of the cowling; fourth, an opening within the cowl for admitting air from within the cowl to the filter; fifth, a conduit from the filter leading to the engine carburetor intake; sixth, a gate within the cowl connected with the carburetor intake conduit and adapted to be manually operated so that air may be admitted to this intake conduit directly from outside the cowl and without passing through the annular filter.

Referring more in detail to the figures of the drawings, I provide an aircraft engine 10 suitably supported at the forward end of the fuselage of an airplane by means not shown for the reason that the engine and its support form no part of the present invention. The entire engine 10 as indicated in the drawings, is surrounded by a streamlining cowl 11 of general cylindrical form having a large central intake opening 12 at its forward or propeller end and surrounding the propeller hub 9 permitting cooling air to enter the cowl 11 to pass and cool the engine cylinders. At the forward end of this cowl 11 and within its periphery so that it is entirely housed therein is an annular filter 13 of any preferred construction but preferably having a plurality of suitable screens 14 angularly disposed to each other to increase the total screening surface and through which a part of the air admitted to the carburetor is constrained to pass. Admission of air to this filter 13 takes place from within the central opening 12 of the cowl 11, and after passing the screens 14 within the filter 13, enters a conduit 15 extending rearwardly to the carburetor intake 16.

Preferably, and as shown in the figures of the drawings, the filter 13 may comprise a large number of relatively small sections of screening material 14 of fine mesh wire cloth to separate any particles of dust and other foreign substances from the air and to permit the filtered air to flow into the conduit 15 leading to the carburetor intake 16 without appreciable loss in pressure. Air from within the cowl 11 enters the filter 13 through an annular opening 18 surrounding the central opening 12 for the cooling air, a portion of the cooling air within the cowl entering this opening 18 for the filter 13 forward of the cylinders of the engine 10.

The forward end of this conduit 15 preferably extends entirely around the periphery of the cowl 11 immediately radially outward of the filter screens 14 so that the intake air enters the forward end of conduit 15 from all directions from within the cowl 11 and immediately after passing through the filter screens 14.

Referring particularly to Figs. 2 and 3 the structure of the filter 13 and screens 14 will be seen to comprise inner and outer interrupted walls 19 and 20 extending circumferentially and concentrically about the forward end of the cowl 11 and housed therein. Sections of screening material such as fine mesh wire cloth 14 are inserted between portions of these walls 19 and 20 in such a manner that air entering the annular opening 18 of the filter 13 within the cowl 11 must necessarily pass this material before entering the forward anular end of the conduit 15 leading to the carburetor intake 16.

In the embodiment illustrated in Figs. 2 and 3 only the substantially radially extending surfaces of the filter 13 are formed of screening material and the spaced sections of the inner and outer walls 19 and 20 are of imperforate sheet metal. Air entering the filter 13 passes through the openings between the sections of the inner wall 19, and after passing through sections of the screens 14 passes from the filter through the openings between spaced sections of the outer wall 20. As shown in Figs. 1, 2, and 3 a front wall 21 closes this end of the filter and constrains the intake air to pass through the sections of screening material 14. From its forward annular end the conduit 15 gradually merges into a passage of generally rectangular cross section extending along the upper portion of the cowl 11 from which it merges into a downwardly extending cylindrical conduit 16 leading directly into the carburetor 17.

In the embodiment of the invention shown in Figs. 4 and 5 a plurality of gates 22 are provided at the front end of the cowl 11 just above the upper portions of the annular filter 13, and adjacent the front end of the conduit 15. These gates 22 are, as shown, hinged at their lower ends by suitable spring hinges 23 and may be manually operated from the cockpit of the plane by suitable cables 24. Normally, these gates 22 may be held by their spring hinges 23 in their open positions lying closely against the outer wall of the filter 13, so that in this position of the gates the conduit 15 is open to the atmosphere. Upon operating the cables 24, these gates 22 may be moved to their closed positions as indicated in the figures and retained in their closed positions by any preferred means. In their open positions, air is admitted directly to the carburetor intake conduit 15 from an opening 25 in the cowl 11 directly in front of the gates 22 without passing through any portion of the filter 13. In their closed positions, air enters the opening 18 from the filter 13 within the cowl 11 and, after passing the filter screens 14 enters the conduit 15 leading to the carburetor intake 16.

It is to be understood that the invention is not limited to the specific embodiments herein illustrated and described, but may be used in other ways without departure from the spirit of the invention as defined by the following claims.

I claim:

1. An air filter for aircraft engines comprising in combination, a sheet metal cowl enclosing an engine and having an opening at its forward end for admission of cooling air to said engine, said cowl having its front edge folded back to form a streamlined opening for said cooling air, a conduit within said cowl extending to the engine carburetor, said conduit having an opening surrounding the terminal edge of said cowl, and a filter for air entering said conduit housed within the folded portions of said cowl.

2. An air filter for aircraft engines comprising in combination, a sheet metal cowl enclosing an engine and having an opening at its forward end for admission of cooling air to said engine, said cowl having its front edge folded back to form a streamlined opening for said cooling air, a conduit within said cowl extending to the engine carburetor, said conduit having an opening surrounding the terminal edge of said cowl, a filter for air entering said conduit housed within the folded portions of said cowl, and a manually controlled gate admitting air to said conduit directly from atmosphere.

3. An air filter for aircraft engines comprising in combination, a sheet metal cowl enclosing an engine and having an opening at its forward end for admission of cooling air to said engine, said cowl having its front edge folded back and within said cowl to form an expanding streamlined opening for said cooling air, a conduit within said cowl extending to an engine carburetor, said conduit having its forward opening surrounding the terminal folded back edge of said cowl, and a filter for air entering said conduit housed within the space between the folded portions of said cowl.

4. An air filter for aircraft engines comprising in combination, an annular sheet metal cowl enclosing an engine and having an opening at its forward end for admission of cooling air to said engine, said cowl having its front edge folded back upon itself to form a streamlined opening for said cooling air, a conduit within said cowl extending to an engine carburetor, said conduit having an annular opening surrounding the terminal edge of said cowl, and a filter for air entering said conduit housed within the space between the folded portions of said cowl, said filter comprising a plurality of annularly arranged separated areas of metal screening material.

5. An air filter for aircraft engines comprising in combination, a sheet metal cowl enclosing an engine and having an opening at its forward end for admission of cooling air to said engine, said cowl having its front edge folded back within said cowl to form a streamlined expanding opening for said cooling air, an air conduit within said cowl extending to an engine carburetor, said conduit having an opening surrounding the terminal folded back edge of said cowl, and a filter for air entering said conduit housed within the space between the folded portions of said cowl, said filter comprising separated radially disposed sections of metal screening material within said cowl, said sections being supported between plates disposed within the cowl.

6. An air filter for aircraft engines comprising in combination, a sheet metal cowl enclosing an engine and having an opening at its forward end for admission of cooling air to said engine, said cowl having its front edge folded back within said cowl to form a streamlined opening for said cooling air, an air conduit within said cowl extending to an engine carburetor, said conduit having an opening surrounding the terminal edge of said cowl, a filter for air entering said conduit housed within the space between the folded portions of said cowl, said filter comprising separated radially disposed sections of metal screening material within said cowl, said sections being supported between plates disposed within the cowl, and a manually controlled gate admitting air to said conduit directly from atmosphere.

FRANK W. CALDWELL.